(12) United States Patent
Macor

(10) Patent No.: US 11,270,294 B2
(45) Date of Patent: Mar. 8, 2022

(54) SYSTEM AND METHOD FOR AUTHENTICATION OF COLLECTABLE OBJECTS

(71) Applicant: James J. Macor, Jackson, NJ (US)

(72) Inventor: James J. Macor, Jackson, NJ (US)

( * ) Notice: Subject to any disclaimer, the term of this patent is extended or adjusted under 35 U.S.C. 154(b) by 574 days.

(21) Appl. No.: 16/237,446

(22) Filed: Dec. 31, 2018

(65) Prior Publication Data

US 2019/0138836 A1 May 9, 2019

Related U.S. Application Data

(63) Continuation-in-part of application No. 12/928,280, filed on Dec. 8, 2010.

(51) Int. Cl.
*G06K 9/00* (2006.01)
*G06Q 20/36* (2012.01)
(Continued)

(52) U.S. Cl.
CPC ..... *G06Q 20/3674* (2013.01); *G01B 9/02077* (2013.01); *G06F 16/532* (2019.01);
(Continued)

(58) Field of Classification Search
CPC ........... G06K 9/00577; G06K 9/00671; G06K 9/3241; G06K 9/183; G06K 9/4604; G06K 9/4642; G06K 9/4671; G06K 9/6202; G06K 9/6215; G06K 9/00154; G06K 2009/0059; G06K 2009/00583; G06K 19/06009; G06K 19/16; G06K 19/086; G06K 2019/06225–0629; G06Q 20/3674;
(Continued)

(56) References Cited

U.S. PATENT DOCUMENTS 5,306,049 A * 4/1994 Schireck .................. G09F 3/00
206/232
5,664,111 A * 9/1997 Nahan ..................... G06Q 10/02
705/26.62
(Continued)

OTHER PUBLICATIONS

Specification of U.S. Appl. No. 60/773,718, filed Feb. 15, 2006. (Year: 2006).*
(Continued)

*Primary Examiner* — Jose L Couso
(74) *Attorney, Agent, or Firm* — Law Office of Perry M. Fonseca

(57) ABSTRACT

Provided is a system and method for authentication of collectable objects. A hi-resolution digital camera in communication with a nonvolatile data storage device having a data partition capable of being made immutable is provided. The nonvolatile data storage device is compatible with a computerized device, and the hi-resolution digital camera is operated to record at least one hi-resolution digital image of at least one unique appearance characteristic of a collectable object at an image resolution of at least 300 pixel dots per inch at 1:1 image scale. The at least one hi-resolution digital image is stored in the data partition of the nonvolatile data storage device, together with additional image data. A tamper-resistant marking associated with the collectable object is placed on the nonvolatile data storage device.

20 Claims, 10 Drawing Sheets

(51) Int. Cl.
*G06F 16/532* (2019.01)
*G06Q 30/06* (2012.01)
*G01B 9/02055* (2022.01)
*G06K 9/32* (2006.01)
*H04L 61/256* (2022.01)

(52) U.S. Cl.
CPC ..... *G06K 9/00577* (2013.01); *G06K 9/00671* (2013.01); *G06Q 30/06* (2013.01); *G06K 9/3241* (2013.01); *H04L 29/12518* (2013.01); *H04N 2201/3236* (2013.01); *H04N 2201/3239* (2013.01)

(58) Field of Classification Search
CPC ...... G06Q 20/40; G06Q 30/06; G06Q 30/018; G06Q 30/0185; G06Q 30/00; G06Q 30/0623; G06Q 30/0601; G06Q 10/087; G06Q 10/10; G06Q 40/04; G01B 9/02077; G06F 16/532; G06F 16/51; G06F 16/5866; G06F 16/54; G06F 21/44; H04N 2201/3239; H04N 2201/3236; H04L 29/12518; G02B 21/06; G02B 21/367; G09F 3/00; G09F 3/0292; G09F 3/0294; G09F 3/20; G09F 5/04; G03H 2001/0055; G03H 2210/54; B65D 2401/00; Y10S 206/807; Y10S 707/99931; Y10S 707/99945; Y10S 707/99948; B82Y 10/00; B42D 15/00; B42D 25/29; B42D 25/00; G07F 7/08; G07F 7/12; A47G 1/12; A63F 1/02; A63F 1/04; A63F 2009/2429; A63F 2009/2489
See application file for complete search history.

(56) References Cited

U.S. PATENT DOCUMENTS

| | | | | |
|---|---|---|---|---|
| 6,070,160 | A * | 5/2000 | Geary | G06N 5/048 |
| 6,203,069 | B1 * | 3/2001 | Outwater | G09F 3/0294 |
| | | | | 283/81 |
| 6,366,899 | B1 * | 4/2002 | Kernz | G06F 16/5838 |
| | | | | 700/130 |
| 6,381,510 | B1 * | 4/2002 | Amidhozour | G06F 16/5838 |
| | | | | 700/130 |
| 6,608,911 | B2 * | 8/2003 | Lofgren | G03H 1/0011 |
| | | | | 382/100 |
| 6,643,666 | B1 * | 11/2003 | Kernz | G06Q 40/04 |
| 7,009,847 | B1 * | 3/2006 | Wu | H01R 13/60 |
| | | | | 174/50.52 |
| 7,046,828 | B1 * | 5/2006 | Gibbs | G06Q 30/00 |
| | | | | 382/119 |
| 2002/0052803 | A1 * | 5/2002 | Amidhozour | G06Q 30/06 |
| | | | | 705/14.51 |
| 2002/0120611 | A1 * | 8/2002 | Kernz | G06Q 30/0623 |
| 2003/0058457 | A1 * | 3/2003 | Fredlund | H04N 1/00175 |
| | | | | 358/1.2 |
| 2003/0220885 | A1 * | 11/2003 | Lucarelli | G06Q 20/382 |
| | | | | 705/64 |
| 2004/0039663 | A1 * | 2/2004 | Kernz | G06Q 40/04 |
| | | | | 705/26.3 |
| 2005/0103840 | A1 * | 5/2005 | Boles | G06Q 30/00 |
| | | | | 382/119 |
| 2006/0152706 | A1 * | 7/2006 | Butland | G06K 9/00577 |
| | | | | 356/71 |
| 2007/0066358 | A1 * | 3/2007 | Silverbrook | G06Q 30/02 |
| | | | | 455/557 |
| 2007/0113451 | A1 * | 5/2007 | McDowell | G09F 3/20 |
| | | | | 40/642.02 |
| 2007/0187266 | A1 * | 8/2007 | Porter | G06Q 10/087 |
| | | | | 206/232 |
| 2009/0015585 | A1 * | 1/2009 | Klusza | G06F 16/51 |
| | | | | 345/420 |
| 2010/0312671 | A1 * | 12/2010 | Land | G06Q 30/0281 |
| | | | | 705/26.1 |
| 2011/0016025 | A1 * | 1/2011 | Gaisford | G06Q 30/0641 |
| | | | | 705/27.1 |
| 2014/0046793 | A1 * | 2/2014 | Mihaly | G06Q 30/06 |
| | | | | 705/26.5 |
| 2015/0223580 | A1 * | 8/2015 | Kinney | A45C 11/182 |
| | | | | 705/318 |
| 2016/0019554 | A1 * | 1/2016 | Macdonald-Korth | G06Q 30/0278 |
| | | | | 705/317 |
| 2017/0180696 | A1 * | 6/2017 | Broughton | G09F 3/20 |
| | | | | 40/642.02 |
| 2020/0143032 | A1 * | 5/2020 | Horstmeyer | H01R 13/60 |
| | | | | 174/50.52 |

OTHER PUBLICATIONS

Drawings of U.S. Appl. No. 60/773,718, filed Feb. 15, 2006. (Year: 2006).*
Specification of U.S. Appl. No. 60/747,955, filed May 23, 2006. (Year: 2006).*
Drawings of U.S. Appl. No. 60/747,955, filed May 23, 2006. (Year: 2006).*

* cited by examiner

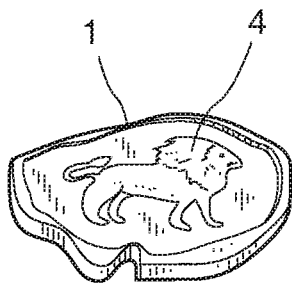

FIG. 6

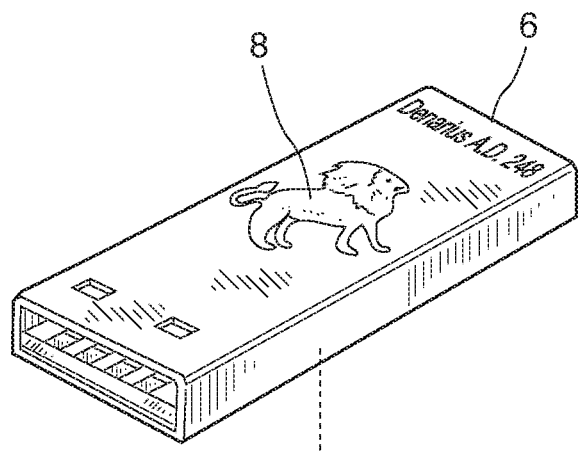

- At least one immutable digital image of at least one unique appearance characteristic of the associative collectable object (shown in Fig. 6).

- May further comprise at least one immutable electronic link that fetches a predetermined remote database related to the collectable object (shown in Fig. 6).

- May further comprises digital picture images of historical objects or persons related to the collectable object (shown in Fig. 6).

FIG. 7

SYSTEM AND METHOD FOR AUTHENTICATION OF COLLECTABLE OBJECTS

CROSS-REFERENCE TO RELATED APPLICATIONS

This application claims priority from co-pending U.S. Non-provisional patent application Ser. No. 12/928,280 filed on Dec. 8, 2010, by James J. Macor titled "Associative Data Storage Device for Authentication of Collectable Objects," which is a continuation-in-part of and claims priority from the following U.S. patent applications: all of which have been filed by the inventor herein: U.S. application Ser. No. 12/924,170, filed on Sep. 22, 2010, entitled "Protection, authentication, identification device for a physical object specimen," U.S. application Ser. No. 12/156,186, filed on May 30, 2008, entitled "Authentication and identification device for a collectable object," U.S. application Ser. No. 12/072,618 (ABN), Feb. 27, 2008 Protection and authentication device for a collectable object," U.S. application Ser. No. 11/710,378, Feb. 23, 2007, entitled "Protection and authentication device for trading collectable objects," U.S. application Ser. No. 11/891,407, filed Aug. 10, 2007, entitled "Collectable display panel and data storage device," U.S. application Ser. No. 11/513,004, filed Aug. 30, 2006, entitled "Associative data storage system for collectable objects," U.S. application Ser. No. 11/493,312, filed on Jul. 26, 2006, entitled "Protection, authentication, identification device for a collectable object," all of which are incorporated herein by reference in their entirety.

FIELD OF THE INVENTION

This invention presents a new system and method for authentication of collectable objects.

BACKGROUND OF THE INVENTION

Small collectable objects such as coins, stamps, sports cards, etc. have been preserved, collected and traded by individuals for as long as collectable objects have existed. Larger collectable objects, such as weapons, vehicles, some sports memorabilia, and the like, are also preserved, collected and traded. Collectable objects, such as coins, have further benefited more recently from grading and certification service organizations that certify a collectable and place the collectable in a tamper resistant holder for protection, preservation and authentication.

Professional collectables certification organizations, such as the Professional Coin Grading Service (PCGS) authenticate, identify, and certify authenticity of collectable objects using certain unique detailed appearance characteristics, which vary from object to object. It is an important objective of the present invention that it may provide visual identification and authentication of a collectable object by providing a means for easily accessing and comparing detailed digital image/s of the unique appearance characteristics of a collectable object. Such unique appearance characteristics of a collectable coin may include, for example, strike, luster, reflectance, color, defects, abrasions, centering, reeding characteristics (edge characteristics), die-varieties, toning, etc. The present invention provides a more robust authentication device for certified collectables, a symbiotic enhancement to professional certification services organizations, and would help deter a growing problem of counterfeit of collectables in the marketplace.

It is another an important objective of the present invention that it provides for a collector to store the actual collectable object in a holder for preservation, and also use (in combination) an "associative" data storage device that is "detached" from the collectable object, and being connectable and operational in a detached condition from the collectable object, and with only the need of a standard computer. The detached (associative) data storage device is configured to record and store at least one immutable digital picture image of at least one unique appearance characteristic of the collectable object for authentication and identification of the collectable object. There are many benefits provided by the present invention device by having a "detached" data storage device that stores detailed digital images of the unique appearance characteristics of the collectable object, and other possible data, such as historical information, in a detached condition from the collectable. For instance, a collector may store a valuable coin in a bank safety deposit box, for enhanced security and protected storage. The associative data storage device (with associative visual markings of the same collectable) serves as a "detached authentication record of that collectable." As such, the device may be utilized by a collector (anytime and anywhere) to view detailed authentication picture image/s of the collectable with only the need for a standard computer, such as a laptop computer. The authentication and identification image record/s provide important benefits, for instance, the associative data storage device may be used for insurance verification, records documentation, and authentication certification should the collector or user decide to sell the collectable.

It is yet another important objective of the present invention that any images and data can be viewed by means of a standard computer, without the need of costly extraneous equipment (e.g., RFID readers and scanners). As such, the present invention teaches a low-cost invention device that eliminates the need for costly extraneous devices, transmitters, readers, scanners, equipment, etc. The present invention device is designed and structured to operate as a low-cost, easy to use device for a common collector, and with only the need for a standard computer.

It is yet another important objective of the present invention that the data storage device, such as a flash memory device, is a "non-volatile" type data storage device (being well known in the industry as without the need for an on-board battery or power source). As the data storage device and authentication record of the unique appearance characteristics of the collectable may be stored for many years, it is an objective of the present that it may be stored without concern of replacing a battery, or the potential adverse effects that may occur, over time, by any adverse chemical reactions that may occur as the result of any attached battery powered component.

It is yet another important objective of the present invention to provide for a long-term digital record of digital picture images of the unique appearance characteristics related to the collectable. This is accomplished by configuring the data storage device to have an immutable condition (resistant to change or alteration) at least in part, or as a whole. As such, the data storage device may be configured in part (a configured electronic partition) with a Read-Only-Memory (ROM), or as a whole, such as a Write-Once-Read-Many (WORM) device that is configured during the write cycle.

In preferred embodiments, it is yet another important objective of the present invention that digital picture image records of the unique appearance characteristics of the collectable object can be viewed by a standard computer, and without the need for online-Internet operability. At the first level of object authentication of the present invention, the collectable object can be verified by simply comparing image/s of the unique appearance characteristics stored on the non-volatile data device and the object itself to determine authenticity. In addition to increased cost for Internet service, at times, depending on equipment, service, and location, Internet online operability may not be available or reliable. Remote storage of digital data or images, are potentially susceptible to all kinds of adverse conditions, malfunctions, and failures that are not "controllable" by the owner of the stored data. Unlike the present invention, remotely stored data and any images, e.g., stored on a host computer or remote server, are susceptible to, for example, software and hardware failures, software viruses, theft, alterations of data or images, telecommunications failure (even temporarily), equipment failures, power failures (even temporarily), environmental calamities (floods and fire), business failures (website closures) (e.g., bankruptcies). Such examples of remote database failures are certainly plausible over time, are not controllable by the owner of the collectable object in hand, and could create an "interim or permanent failure" for the user to view any data, records, or images at all. The present invention overcomes the aforesaid deficiencies relying solely upon remote storage of any data or images.

SUMMARY OF THE INVENTION

A collectable authentication system and method is presented. In an aspect of the invention, the system and method includes a hi-resolution digital camera in communication with a nonvolatile data storage device having a data partition capable of being made immutable. The nonvolatile data storage device is compatible with a computerized device, and the hi-resolution digital camera operated to record at least one hi-resolution digital image of at least one unique appearance characteristic of a collectable object at an image resolution of at least 300 pixel dots per inch at 1:1 image scale. The hi-resolution digital image is then stored in the data partition of the nonvolatile data storage device, together with additional image data. Additional image data may include, but is not limited to: historical information regarding the collectable object, ownership history of the collectable object, a hyperlink for accessing further online information regarding the collectable object, one or more encryption keys for accessing non-public data regarding or related to the collectable object, or the like, without limitation.

Another aspect of the invention also includes a tamper-resistant marking associated with the collectable object placed on the nonvolatile data storage device. The marking may include an image of the collectable object or another image that allows a user to recall the collectable object, or a bar code useful for encoding a serial number or other information reminiscent of the collectable object, or even a word or code associated with the collectable object, or the like, without limitation.

In another aspect of the invention, the data partition of the nonvolatile data storage device being rendered immutable. By "immutable," it is intended that the actual "write" circuit on the nonvolatile data storage be physically disabled for the data partition, not merely that the partition is marked "read only."

In a further aspect of the invention, a computer system comprising data storage configured to operate a database is provided. The computer system is in operative communication with the hi-resolution camera, and the database stores the at least one hi-resolution digital image and additional image data. In an aspect of the invention, the additional image data comprises a secure electronic hyperlink that provides access to the database.

Another aspect of the invention provides a collectable object authentication system method including a nonvolatile data storage device having an immutable data partition compatible with a computerized device. The nonvolatile storage device is preconfigured with at least one hi-resolution digital image of at least one unique appearance characteristic of a collectable object at an image resolution of at least 300 pixel dots per inch at 1:1 image scale together with additional image data. The at least one hi-resolution image on the non-volatile storage device is compared with a collectable object. If the at least one hi-resolution image and the object match, then the object is determined to be authentic. Otherwise, if the at least one hi-resolution image and the object do not match, then the object is determined to not be authentic.

In a further aspect of the invention, a hi-resolution digital camera in operative communication with the computerized device is operated to record at least one hi-resolution current image of the collectable object, which is then compared with the at least one hi-resolution image from the nonvolatile data storage device. In an aspect of the invention, the comparison is performed automatically by the computerized device, the computerized device preconfigured to perform the comparison.

In another aspect of the invention, the computerized device is in communication with a database preconfigured with the at least one hi-resolution digital image and additional image data. The additional data on the nonvolatile data storage device includes an access key to allow access to the database and at least one digital image. The at least one hi-resolution image from the database is then compared with the at least one hi-resolution current image of the collectable object.

In an aspect of the invention, the non-volatile data storage is a solid-state flash memory data storage device.

In another aspect of the invention, the unique appearance characteristic is an identification marking associated with the collectable object.

In an aspect of the invention, the identification marking is on a holder for the collectable object. The collectable object may be sealed in the holder or removable.

In one embodiment of the present invention, a system and method for authentication of collectable objects is described. A non-volatile electronic data storage device is used in combination with at least one collectable object. The non-volatile electronic data storage device is detached from the collectable object and electronically configured to store at least one immutable digital image of at least one unique appearance characteristic of the collectable object. The data storage device is provided with tamper resistant visual markings that are associative with visual markings of the collectable object so as to provide association of the data storage device with the collectable object. The non-volatile electronic data storage device is compatible with a standard computer system for a user to view one or more digital images of the unique appearance characteristics of the collectable object for authentication and identification of the collectable object. In preferred embodiments, the non-volatile data storage device is a solid-state Flash Memory type data storage device. The collectable object may have more than one characteristic associated with the collectable object, and the non-volatile electronic data storage device may include data of more than one characteristic of the collectable object.

The non-volatile electronic data storage device includes tamper resistant visual markings associative with a collectable object. A holder may be used to store the collectable object. The data storage device includes tamper resistant visual markings associative with the collectable object that are also associative with tamper resistant visual markings of a holder that houses the collectable object. The tamper resistant markings of the holder are associative with at least one corresponding tamper resistant visual marking of the non-volatile electronic data storage device, and may be or include a corresponding barcode.

In some embodiments, the non-volatile electronic data storage device may be detachably stored in a container having a formed cavity fitted for the data storage device, and, the collectable object is also detachably stored in the same container having a formed cavity fitted for storing the collectable object.

The non-volatile electronic data storage device may further comprise digital picture images of historical objects or persons related to the collectable object. In some embodiments, the non-volatile electronic data storage device may further comprise at least one immutable electronic link that fetches a predetermined remote database that stores information related to the collectable object. For security reasons, the electronic link may be encrypted.

BRIEF DESCRIPTION OF THE DRAWINGS

FIG. 6 shows a top perspective view of an exemplary collectable object that is useful for understanding the present invention.

FIG. 7 shows a top perspective view of a non-volatile electronic data storage device that is useful for understanding the present invention.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

Figure 1:
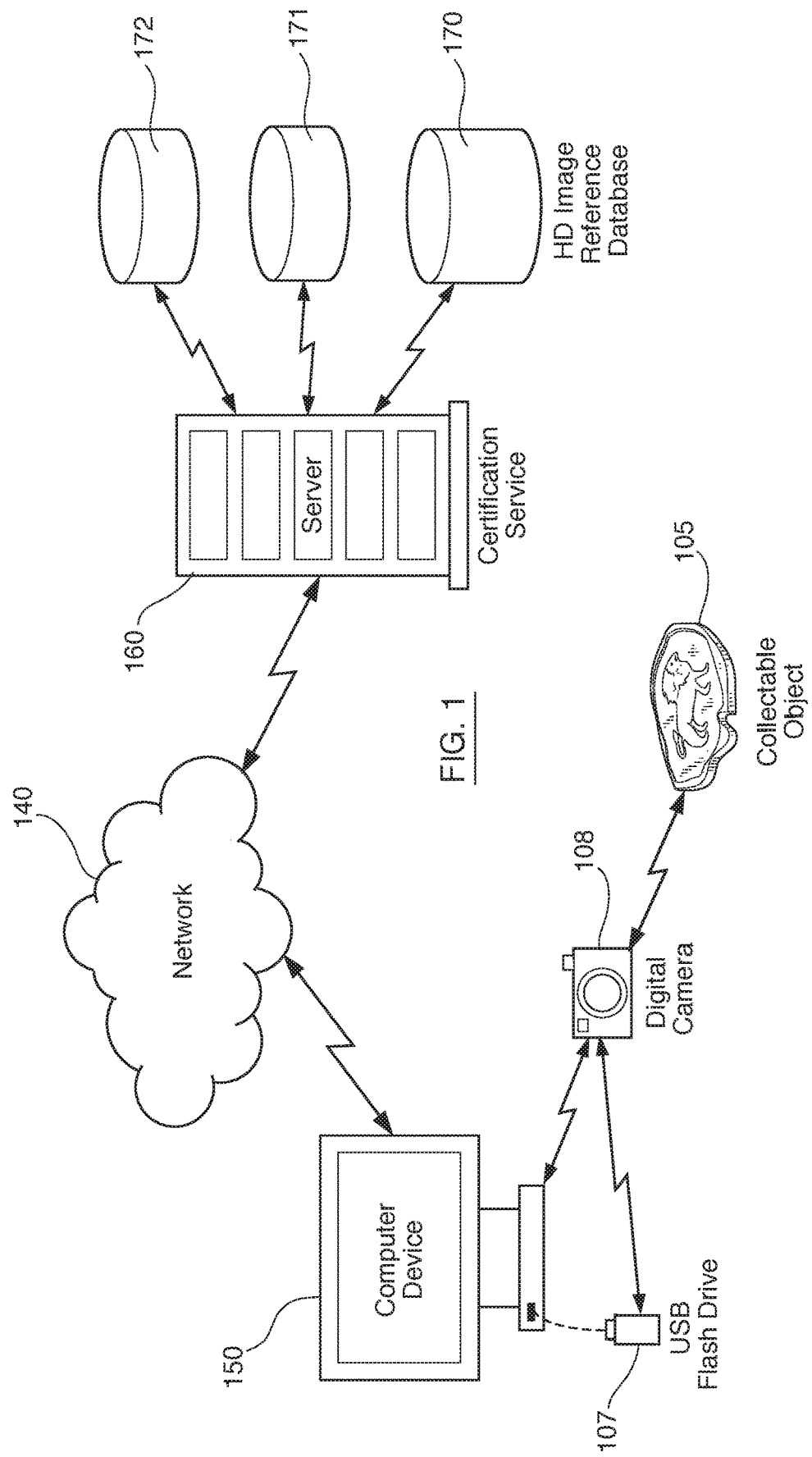
FIG. 1 is a block diagram of an exemplary system that is useful for understanding the present invention.

A block diagram of an exemplary system for collectable authentication is presented in FIG. 1. A collectable object 105 is imaged by a hi-definition digital camera 108 at an image resolution of at least 300 pixel dots per inch at 1:1 image scale. In the case of a large collectable object, a portion of the object may be imaged instead of the entire object. This image is then processed by a computer device 150 and written to a non-volatile data storage device 107. The computer device may be incorporated within the digital camera 108, or the camera 108 and computer device 150 may be integrated components of another electrical device, such as a cellular telephone.

In an embodiment of the invention, the computer device 150 is in communication with a server 160 over a communications network 140, such as the Internet. The server 160, for example, may be provided by a certification service and operate multiple databases 170, 171, 172, including a hi-definition image database 170. A copy of the image of the collectable object is transferred from the digital camera 108, over the computer device 150, through the network 140 and server 160 and onto the hi-definition image database 170. An access key may also be generated and propagated back through the server 160, network 140 and computer device 150 and written onto the non-volatile data storage device 107, to allow access to the hi-definition image database 170 using the non-volatile data storage device 107.

In a preferred embodiment of the invention, the non-volatile data storage device 107 would then be rendered permanently immutable in the partition in which the collectable image and access key are stored by physically disabling its "write" circuit.

Figure 2:
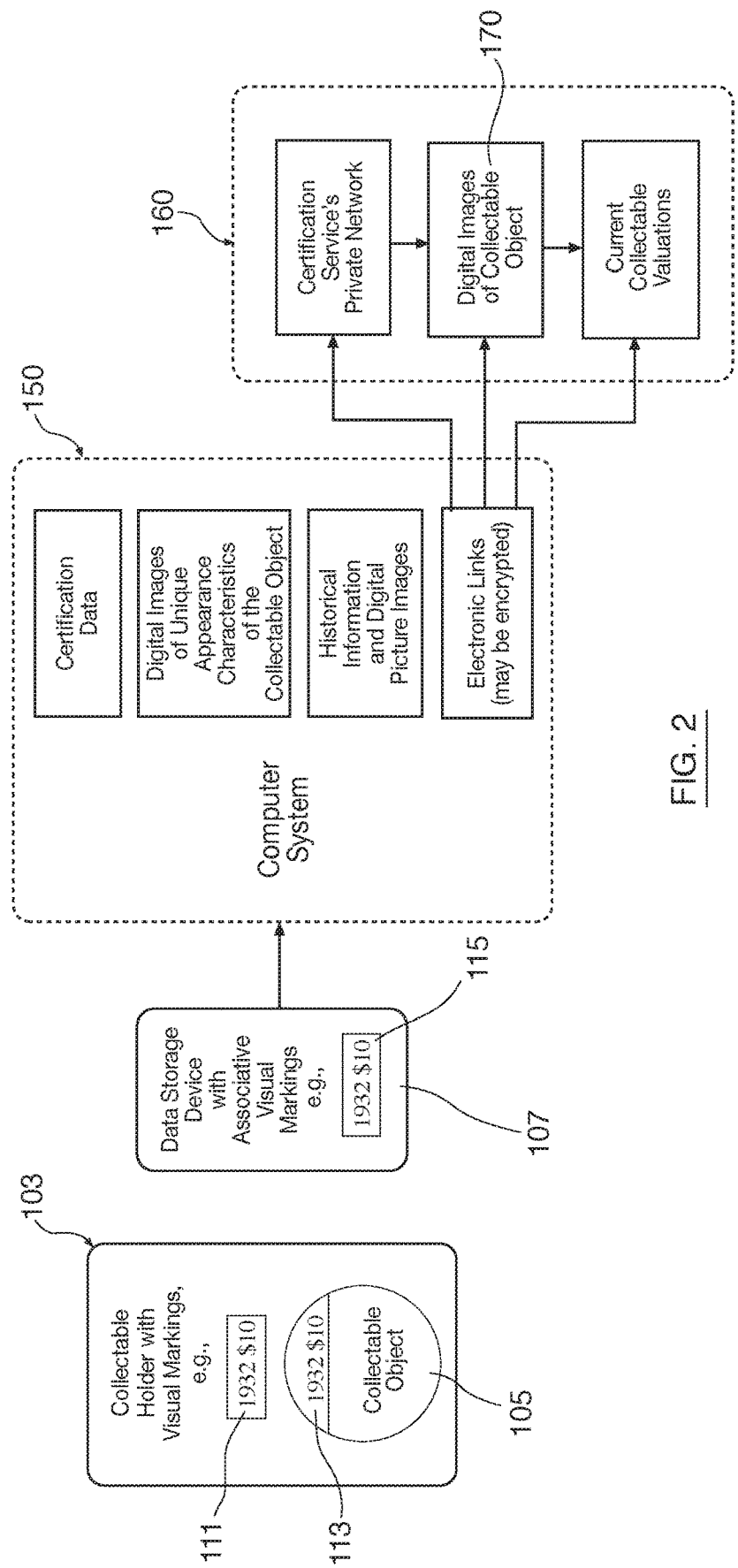
FIG. 2 is another block diagram of an exemplary system that is useful for understanding the present invention.

FIG. 2 shows a diagram of a present invention system and method for use in combination with a collectable object and a standard computer system. A non-volatile electronic data storage device 107 is used in combination with at least one collectable object 105 for authentication of collectable object 105. The non-volatile electronic data storage device 107 is detached from collectable object 105 and electronically configured to store at least one immutable digital image of at least one unique appearance characteristic of collectable object 105. Non-volatile electronic data storage device 107 is provided with tamper resistant visual markings 115 that are associative with visual markings 113 of collectable object 105 so as to provide association of the data storage device 107 with the collectable object 105. Collectable object 105 may be stored in a holder, such as holder 103. Non-volatile electronic data storage device 107 includes tamper resistant visual markings 115 associative with visual markings 113 of collectable object 105 that are also associative with tamper resistant visual markings 111 of holder 103.

The non-volatile electronic data storage device 107, such as a USB flash drive type data storage device, is compatible with a computer system 150 for a user to view one or more digital images of the unique appearance characteristics of collectable object 105 for authentication and identification of at least one unique appearance characteristic of collectable object 105. Non-volatile electronic data storage device 107 may also store historical information that may include digital picture images of historical objects and persons related to collectable object 105. Non-volatile electronic data storage device 107 may further include data of at least one characteristic of collectable object 105, such as certification data, and can viewed by a user on standard computer system 150. In some embodiments, non-volatile electronic data storage device 107 may further comprise at least one electronic link, such as a Hyperlink, that may fetch a predetermined remote database 160 that is related to coin 105 and accessed by a computer system 150. Predetermined remote database 160 may be a certification service's private network and may include additional comparative images 170 of collectable object 105 and other information, such as volatile (changing information) and may include, for example, current certified populations and current valuations of collectable object 105. Remote database 160 may have an encrypted relationship with data storage device 107 in whole, or in part. It may include link encryption, end-to-end encryption, or file-system-level encryption, whereas only certain files are encrypted. Encryption is well known in the industry as a security protocol used to protect data in transit, by making it unreadable to anyone except those possessing special knowledge, usually referred to as a key. In this example of the present invention, data storage device 107 may comprise an encrypted key wherein the electronic link is an encrypted electronic link that enables the user of data storage device 107 to access remote database 160, and/or specific encrypted digital images and other information of database 170 that is related to collectable object 105.

Figure 3:
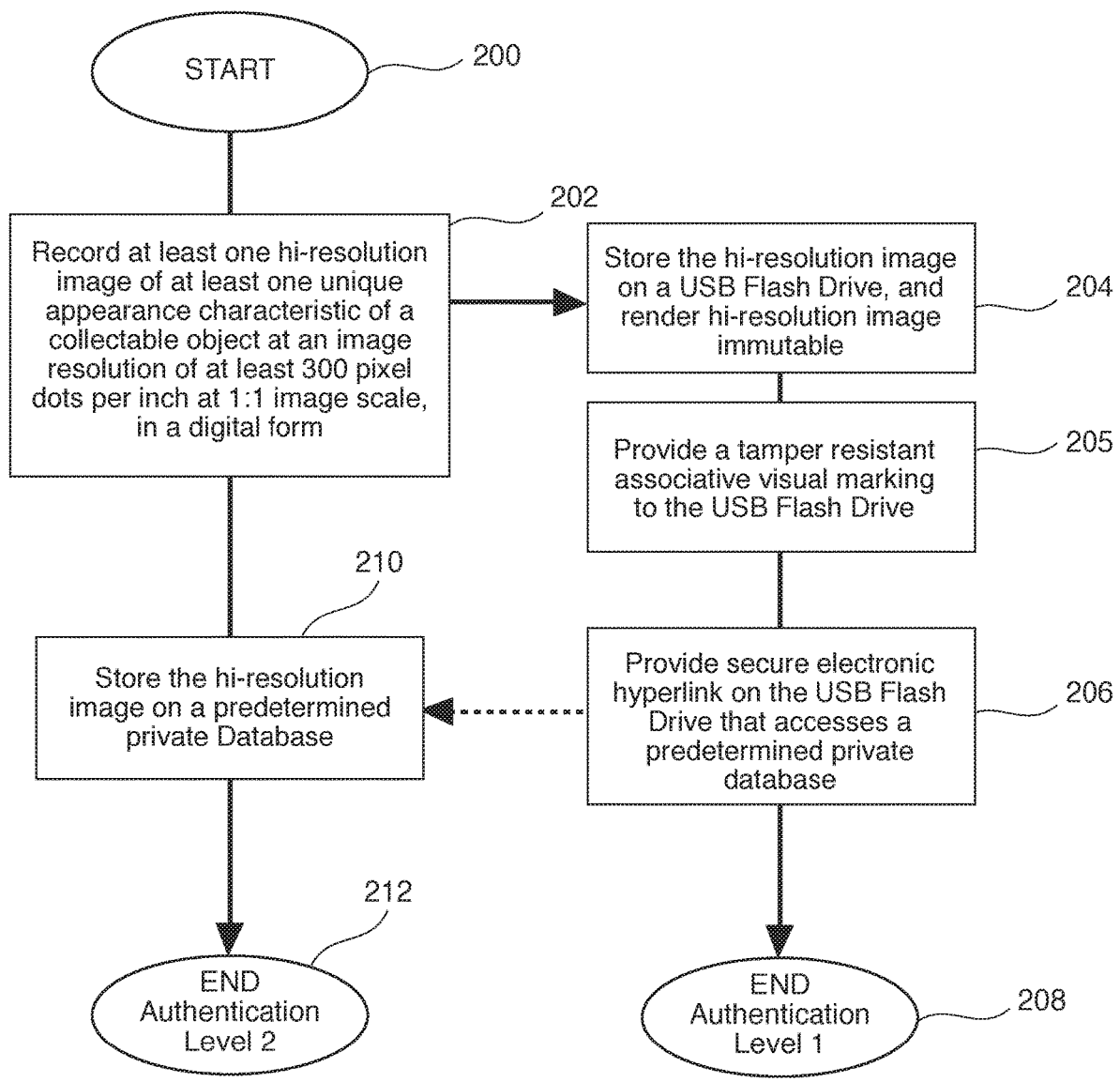
FIG. 3 is a flowchart of an exemplary method that is useful for understanding the present invention

An exemplary flowchart of setting up a non-volatile data storage in accordance with an embodiment of the invention is presented in FIG. 3. To begin 200, at least one hi-resolution image of at least one unique appearance characteristic of a collectable object is recorded 202 at an image resolution of at least 300 pixel dots per inch at 1:1 image scale in a digital form. The hi-resolution image is then stored 204 on a USB flash drive, and the image is rendered immutable. A tamper resistant associative visual marking is added 205 to the USB flash drive. A secure electronic hyperlink is provided 206 on the USB flash drive that accesses a predetermined private database. This comprises a first level of authentication 208.

In a further embodiment, the hi-resolution image is also stored 210 on the predetermined private database, which comprises a second level of authentication 212.

Figure 4:
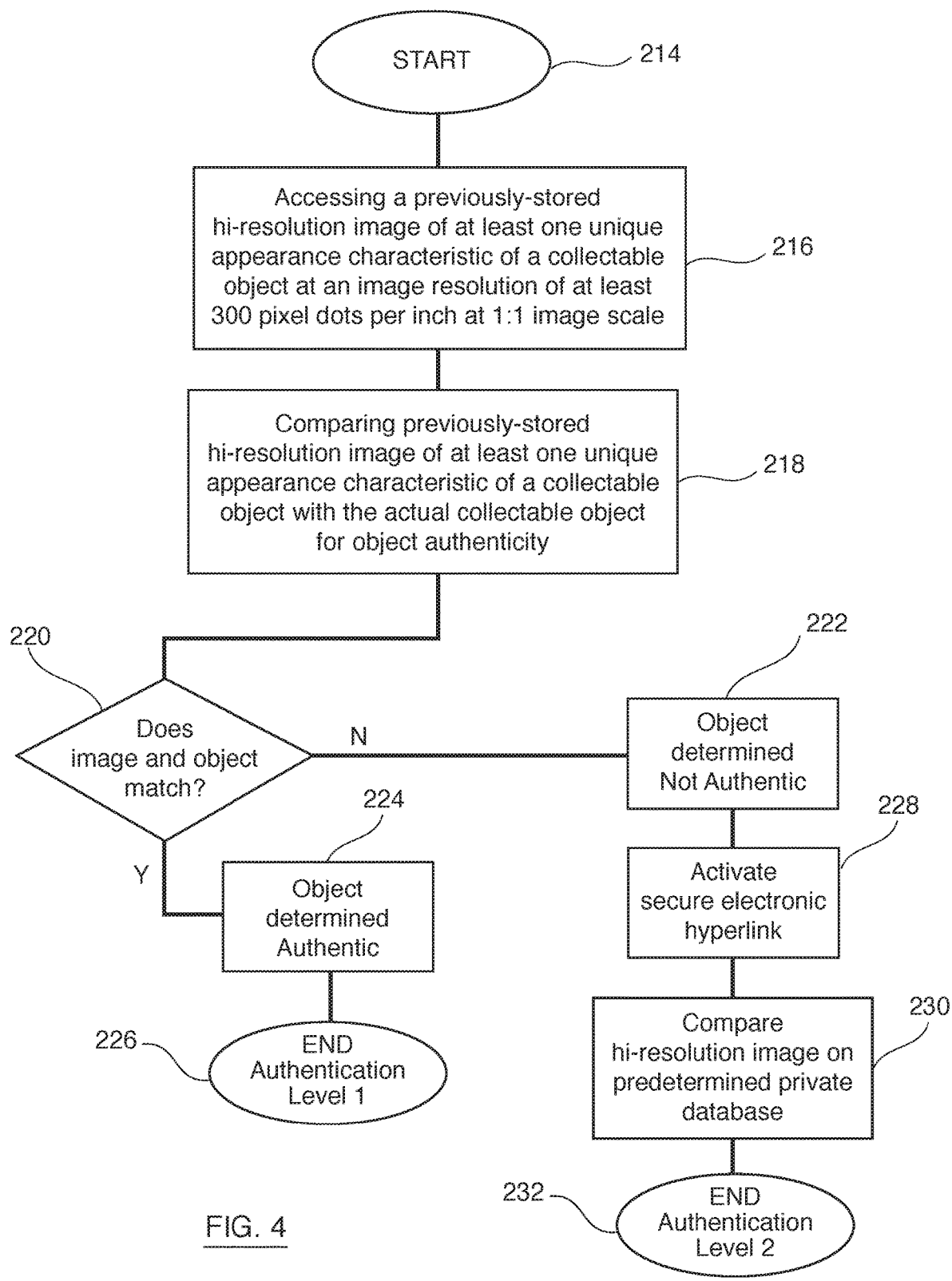
FIG. 4 is a flowchart of an exemplary method that is useful for understanding the present invention

An exemplary flowchart of determining authenticity of a collectable object in accordance with the present invention is provided in FIG. 4. To start 214, a previously-stored hi-resolution image of at least one unique appearance characteristic of a collectable object at an image resolution of at least 300 pixels dots per inch at 1:1 image scale. Next, the hi-resolution image is compared 218 with the actual collectable object. If the image and object match 220, then the object is determined authentic 224, and the process ends 226. Otherwise, the object is determined not authentic 222, and a secure electronic hyperlink can be activated 228 to compare the hi-resolution image on the predetermined private database with the collectable object 230 to do a second-level authentication. Similarly, the hi-resolution image on the predetermined private database can be compared with the image on the non-volatile storage device to determine if the non-volatile storage device has been tampered with.

Figure 5:
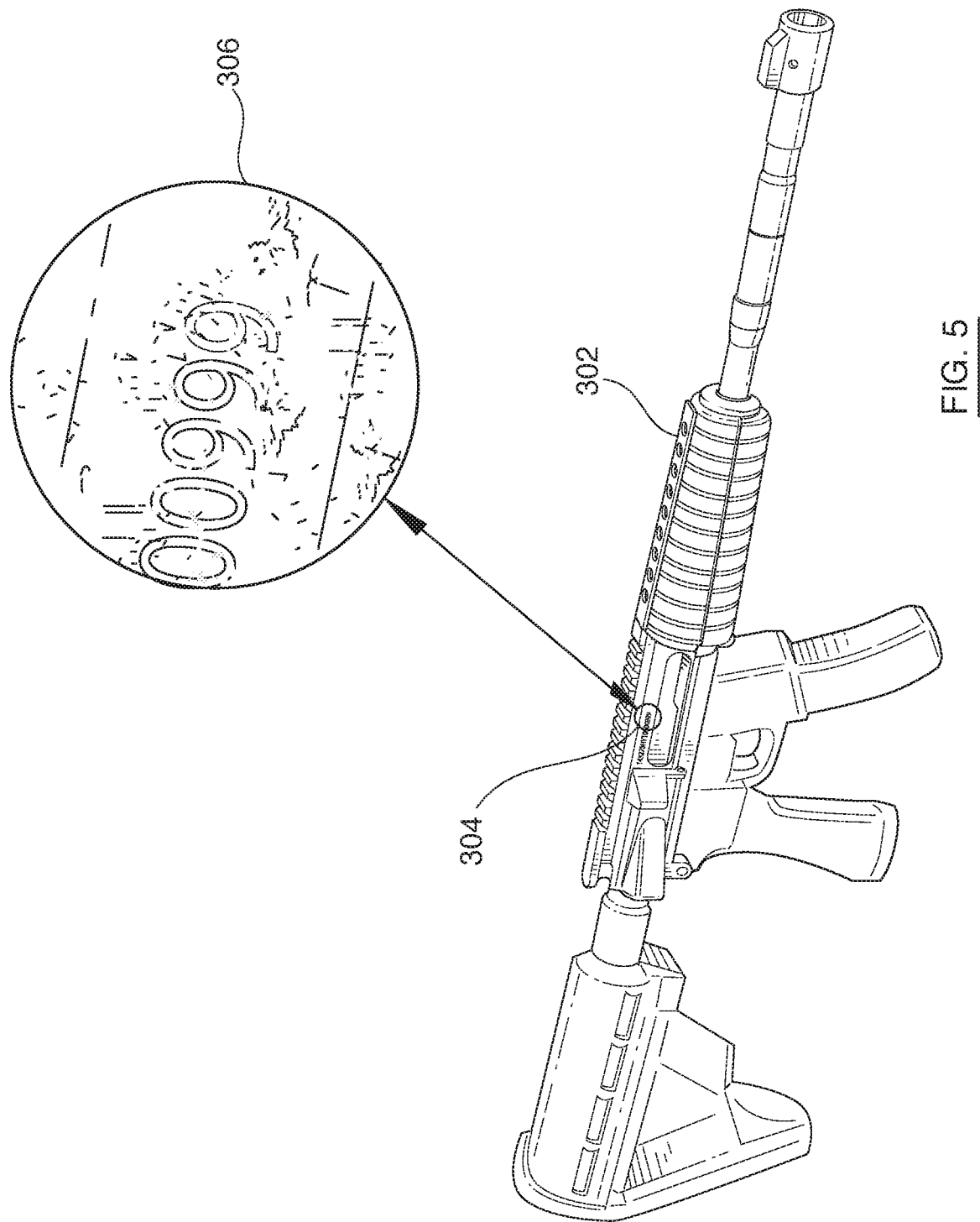
FIG. 5 shows a right front perspective view of an exemplary collectable object that is useful for understanding the present invention.

A right front perspective view of an exemplary collectable object is presented in FIG. 5. Many collectable objects are too large to conveniently be imaged by a single hi-resolution image. In the example of FIG. 5, a weapon with an engraved serial number is provided. In this case a hi-resolution image of the engraved serial number does offer a unique appearance characteristic of the collectable object, as demonstrated by the magnified section 300. In such cases, the identifying aspect of the hi-resolution image is not the actual name or serial number imaged, but rather the highly detailed irregularities of the engraving.

FIG. 6 shows a top perspective view of a collectable object having visual markings for use in combination with a non-volatile electronic data storage device having tamper resistant visual markings, shown in FIG. 7, for use in the present invention. Other examples of small collectable objects may include, for example, stamps, currency, sports cards, etc., and would tend to benefit from a protective holder for preservation of such smaller type collectables. "Collectable" simply refers to an object having a trait of human interest to be collected. Collectable objects are typically purchased or acquired by a fancier for enjoyment, examination, and/or investment.

In FIG. 6, collectible coin 1 is an example of a collectable object for use in the present invention with a non-volatile electronic data storage device, shown in FIG. 7, for authentication and identification of the unique appearance characteristics of coin 1. Coin 1 may be for instance, an ancient Roman double Denarius struck in A.D. 248. Collectable objects, such as coin 1, possess "visual markings" typically formed from the striking of the coin's design elements that are engraved into a die-hub, and formed by a press that strikes the design into coin planchets (blank metal discs), or in ancient times even by hand. Visual markings of a coin may include, for example, dates of minting, inscriptions, denomination, country of origin, design elements (such as portraits of persons, animals, landmarks, events, and buildings), mintmarks, legends, etc. For instance, as illustrated on coin 1, there is visual marking 4 of a lion design element having a particular shape, scale, relief, and other identifiable characteristics. Furthermore, additional visual markings of coin 1 may include, for instance, its unique shape, reeding characteristics (edge of the coin), minute striking details, reflectance, luster patterns, abrasions, toning, coloration, and other visual markings that may be found on the opposite side (reverse) of coin 1 (not shown).

FIG. 7 shows a top perspective view of a non-volatile electronic data storage device 6 having tamper resistant visual markings 8 for use in combination with a collectable object having visual markings, shown in FIG. 6. Non-volatile electronic data storage device 6, may be a Flash Memory type data storage device, and well known for its non-volatile condition, or lack of an on-board power source, such as a battery. Non-volatile electronic data storage device 6 is used in combination with a collectable object, to provide an authentication record by identification of one or more unique appearance characteristics of the collectable object.

Non-volatile data storage device 6 is provided with tamper resistant visual markings associative with visual markings of at least one collectable object, such as coin 1 shown in FIG. 6. "Tamper resistant" means resistant to tampering or alteration. "Associative" means associated with or related to an element or characteristic of another. For example, visual marking 8 (lion design element) is associative with visual marking 4 (lion design element) as shown on coin 1, in FIG. 6. Although there are many different means and methods to provide tamper resistant visual markings, a permanent silk-screened vinyl ink application of visual markings 8 on the surface of data storage device 6, would be considered tamper resistant visual markings for use in the present invention.

Diagram 12, as shown in FIG. 7, is illustrative of the digital images and data that may be recorded on non-volatile electronic data storage device 6. Non-volatile electronic data storage device 6 is electronically configured to store at least one immutable digital image of at least one unique appearance characteristic of at least one collectable object. Non-volatile electronic data storage device 6 may further comprise digital picture images of objects and/or persons related to a collectable object, such as coin 1, shown in FIG. 1. In this example, non-volatile electronic data storage device 6 may include digital picture images related to coin 1 (shown in FIG. 6), such as a Double Denarius struck in A.D. 248 to commemorate the 1000.sup.th anniversary of Rome's founding. Detailed digital picture images and historical facts may include, for example, digital picture images of the reining ruler, culture, dress, art, and other relevant historical information and images related to coin 1 (shown in FIG. 6) and recorded and stored on data storage device 6, shown in FIG. 7. Furthermore, non-volatile electronic data storage device 6 may comprise at least one immutable electronic link that fetches a predetermined remote database related to the collectable object. The database may include related information, related collectables for sale, valuation of the collectable, rarity populations of the collectable, and any other information of relevance.

Figure 8:
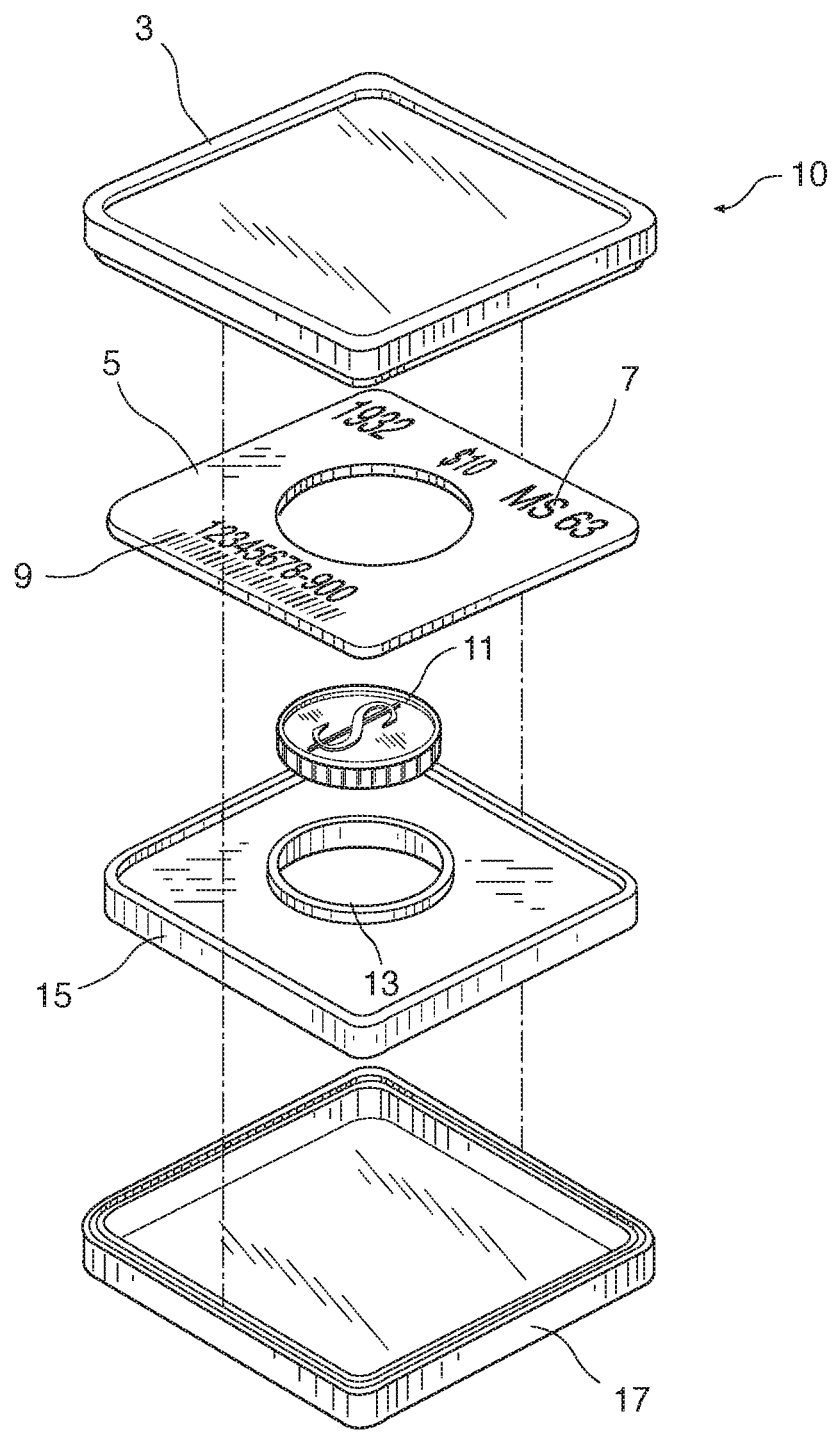
FIG. 8 shows a right front perspective, exploded view of a holder for a collectable object that is useful for understanding the present invention

FIG. 8 shows a right front perspective, exploded view of a holder for a collectable object including visual markings of the collectable object as used in the present invention. Other small collectable objects of value and/or interest, such as stamps, currency, or sports cards are additional examples of collectable objects that would also be applicable to the present invention and would benefit from a protective holder for preservation of the collectable. Collectable objects, such as coin 11, possess visual markings, for example, and may have a date, a denomination, design elements, and other visual appearance characteristics. Coin 11 is shown having a visual marking "$" that may be related, for example, to the denomination of coin 11. Upon assembly, coin 11 is protected by holder 10 and comprised of upper housing 3 and lower housing 17, that may be made of a clear plastic material, such as an acrylic or polycarbonate material. Upper housing 3 and lower housing 17 may have a means to snap together, may be glued together, or may be ultrasonically bonded to further deter removal (detachment) of coin 11 from holder 10 upon assembly with holder 10. Also shown, is optional core component 15 that may be utilized to hold coin 11 in place by means of a friction fit, and coin 11 is simply inserted into core component opening 13 during the assembly process of coin 11 with the protective holder upper and lower housing parts. Core component 15 may be comprised of a plastic material, such as nylon, that retains coin 11 by means of a cut-through opening 13 and allows viewing of the front (obverse) and rear (reverse) of coin 11. Alternately, and within the scope of the present invention, core component 15 may be eliminated if holder 10 includes a formed recess or well in upper housing 3 or lower housing 17 that provides a substantial friction fit to retain coin 11, and thereby substantially reducing movement of coin 11 inside holder 10 upon assembly. Still again, a protective holder may simply be a clamshell type holder that is round in shape, and includes an upper and lower housing that are substantially formed just slightly larger than the width and height of coin 11, and may be pressed together to house coin 11. Plastic holder 10 that houses coin 11 after assembly may include label 5 with visual markings and descriptors 7 of coin 11. For instance coin 11 may be a 1932 Indian $10 gold coin, and visual markings 7 may include, for example the date, the denomination, and a condition grade. As such, upon assembly of holder 10 with collectable object 11, label 5 provides tamper resistant visual markings that are associative with visual markings of coin 11. Visual markings 9 may simply be a corresponding barcode related to visual markings 7, and associative with the tamper resistant visual markings 23 of a non-volatile electronic data storage device as shown in FIG. 9.

Within the scope of the present invention, a collectable object is not required to be placed in a protective holder. For smaller collectables, such as coins, stamps, sports cards, and the like, a holder can provide an inexpensive means for protection and preservation of the collectable. However, as is the case with larger collectables, including collectable automobiles, artwork, antiques, and the like, such larger collectables cannot be practically housed in a protective holder, however, the present invention is also applicable to larger collectible objects. Larger collectable objects, such as a limited production automobile, also possess visual markings and unique appearance characteristics. For instance, a collectable automobile may have visual markings that include, for example, a manufacturer's identification tag, typically a stamped metal tag often located on the firewall structure of an automobile. The metal tag may having visual markings include, for example, a unique serial number, date of manufacture, plant of manufacture, engine code, and other visual identification markings inherent to a particular the model, make, and options of the particular automobile. Not unlike a collectable coin that possesses visual markings for authentication and identification purposes, a 1970 Pontiac Trans Am Firebird automobile, for example, also possesses visual markings that may be utilized for authentication and identification of the unique appearance characteristics of a particular automobile. For example, unique appearance characteristics for a 1970 Pontiac Trans Am Firebird, may include, for example, an identification tag (ID) that includes a unique serial number, a stamped or etched unique engine code/serial number (often located on the engine block), and a stamped or etched unique transmission code/serial number (located on the transmission housing). Other visual markings, may include, for example, the odometer device displaying the mileage reading of the automobile, exterior paint characteristics, paint blemishes, chips, abrasions, scratches, interior component visual markings, and other unique appearance characteristics inherent to that particular collectable automobile or collectable object of interest.

Figure 9:
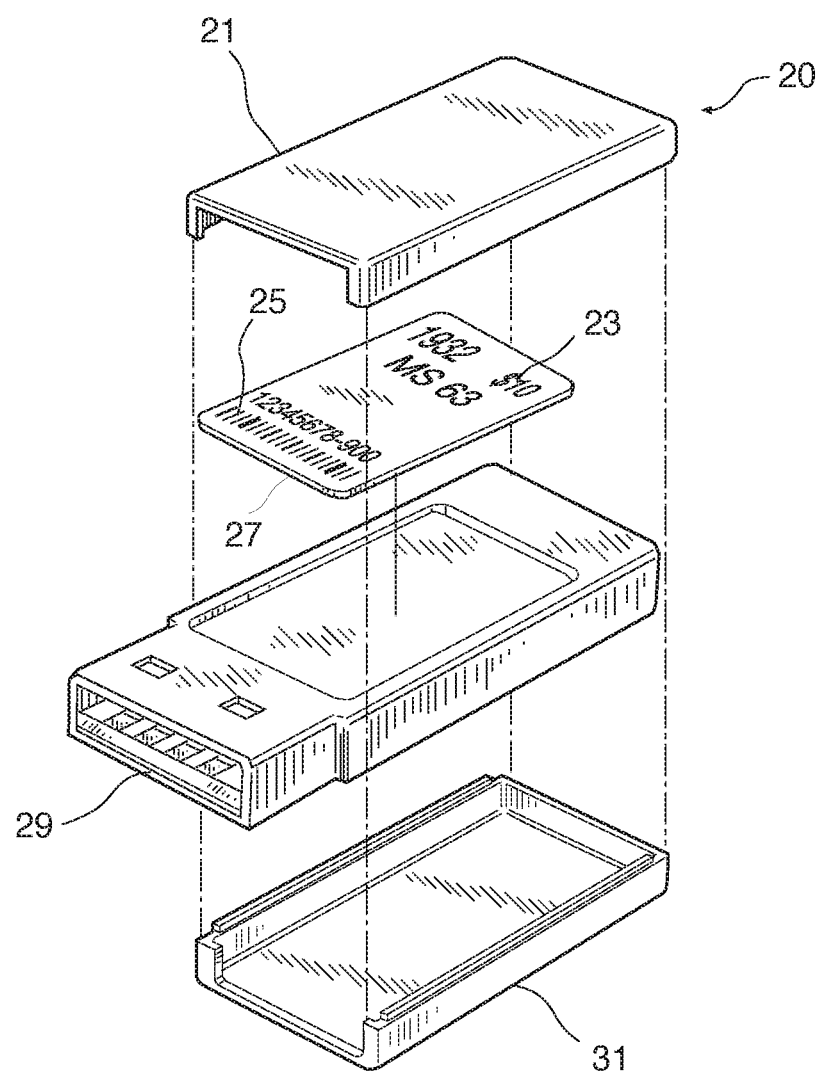
FIG. 9 shows a right front perspective, exploded view of a data storage device that is useful for understanding the present invention.

FIG. 9 shows a right front perspective, exploded view of a data storage device including tamper resistant visual markings of an a collectable object as used in the present invention (discussed in FIG. 8). Upon assembly, non-volatile electronic data storage device 29 is provided with tamper resistant visual markings 23 that are associative with the visual markings of at least one collectable (as shown and discussed in FIG. 8), and is detached from the collectable object (shown in FIG. 6). Data storage device holder 20 includes tamper resistant visual markings 23 (shown in an exploded unassembled view) upon assembly with data storage device 29.

Data storage device holder 20 may be comprised of data storage device 29, a label 27 that provides a method for displaying visual markings 23 and 25 in a tamper resistant method, and a clear protective housing that is assembled together as shown with upper housing 21 and lower housing 31. Tamper resistant visual markings 23 are associative with the visual markings of the corresponding detached collectable object 11, or a holder that houses collectable object 11 (shown in FIG. 8) so as to provide association of the data storage device with the collectable object. Visual marking 25, for example, may include a corresponding barcode 25 in FIG. 7, and shown as barcode 9 in FIG. 8.

Tamper resistant visual markings may be provided for by means of a tamper resistant holder that houses data storage device 29, at least in part, and including a label 27 with tamper resistant visual markings 23 that are associative with a collectable object. As shown in FIG. 9, holder 20 may be comprised of an upper housing 21, and a lower housing 31 that are formed to enclose and protect label 27, visual markings 23, barcode 25, and data storage device 29. The holder may be made of a clear plastic, such as acrylic, and may be designed to be tamper resistant upon assembly that would make it difficult for a user to disassemble the holder once it has been assembled. This may be accomplished, for example, by a method that securely bonds upper housing 21 and lower housing 31 together, such as ultrasonic welding of the plastic mating surfaces during an assembly process. In this example, Label 27 provides a tamper resistant means for displaying associative visual markings of collectable object 11 (shown in FIG. 6), and may include collectable object descriptors, such as the date, the denomination, and a certification grade of the associative collectable object. Within the scope of the present, many other methods may be utilized to promote tamper resistance.

Data storage device 29, is shown as a USB Flash Drive, which is illustrated as only an example of an electronic non-volatile data storage device for use in the present invention because of it's compact size, and non-volatile memory (NVM) capability. However, many other examples of data storage devices could also be used such as a Flash Memory Card, PC Card, Memory Card, MultiMedia Card, Secure Digital Card, Memory Stick, xD-Picture Card and other compact sized, solid-state data storage devices. "Non-volatile" is well known in the industry as not having a power source integrated (on-board) with the data storage device itself, such as a battery. As the data storage device may be stored for many years, it is an objective of the present that it may be stored without concern of replacing a battery, or the potential adverse effects that may occur, over time, by any adverse chemical reactions that may occur with any attached battery or power source.

Data storage device 29 is configured to store at least one immutable digital image of at least one unique appearance characteristic of a collectable object, such as coin 11 shown in FIG. 8. "Immutable" shall mean data that is highly resistant to change or alteration. As such data storage device 29 is configured to have an immutable condition, at least in part, to deter a user from altering or erasing some or all images (and data) stored on data storage device 29. As such, data storage device 29, may be configured with a Read-Only-Memory (ROM), at least in part (such as an integrated circuit partition of the data storage device), or may be configured as a Write-Once-Read-Many (WORM) device that is immutable as a whole.

Unique appearance characteristics are commonly used by collectors and certification services for authentication and identification of a collectable object, such as coin 11, shown in FIG. 8. Data storage device 29 is configured to record and store at least one immutable digital image of at least one unique appearance characteristic of a collectable object and can be utilized for authentication and identification of the appearance characteristics of the collectable object.

Data storage device 29 is compatible with a standard computer system and does not require Internet-online operability for a user to view, evaluate, and compare digital images of the unique appearance characteristics of the associative (detached) collectable object. Data storage device 29 may comprise one or more detailed digital images of the appearance of the front (obverse), the back (reverse), and possibly the edge (reeding) of the coin. Certain images may be magnified to identify and focus on certain unique appearance characteristics of the collectable object, including very small details such as die-varieties (unique engraved dies used for minting the obverse and reverse of a coin), striking characteristics of the coin (related to the condition and striking pressure of the die), minute luster patterns created during the minting process, edge "reeding" characteristics (edge of a coin formed by a collar), minute abrasions or wear, and other minute identification appearance characteristics. Often times, collectable objects have more than one characteristic associated with the collectable object (such as coin 11 shown in FIG. 8), and data storage device 29 may include data of more than one characteristic of the collectable object. As such, data storage device 29 may include additional data, such as the date of minting, the production mintage, and a condition grade by a certification service of the collectable object. Additional information such as historical information including digital picture images of historical objects and/or persons that are associated with the collectable object may also be stored in data storage device 29. In some embodiments of the present invention, data storage device 29 may also contain one or more predetermined external database electronic links, such as the certification service's private network, and may be in the form of Internet Hyperlinks that can fetch (access) additional predetermined characteristics of the collectable coin, images, and other related data. Such "volatile" (changeable) data may include, for example, the current certification population and current valuation of the collectable object. Label 27 may further include a barcode 25, and when read by an appropriate barcode reader, may also provide predetermined characteristics of the associated collectable object by means of an appropriate barcode reader device.

Figure 10:
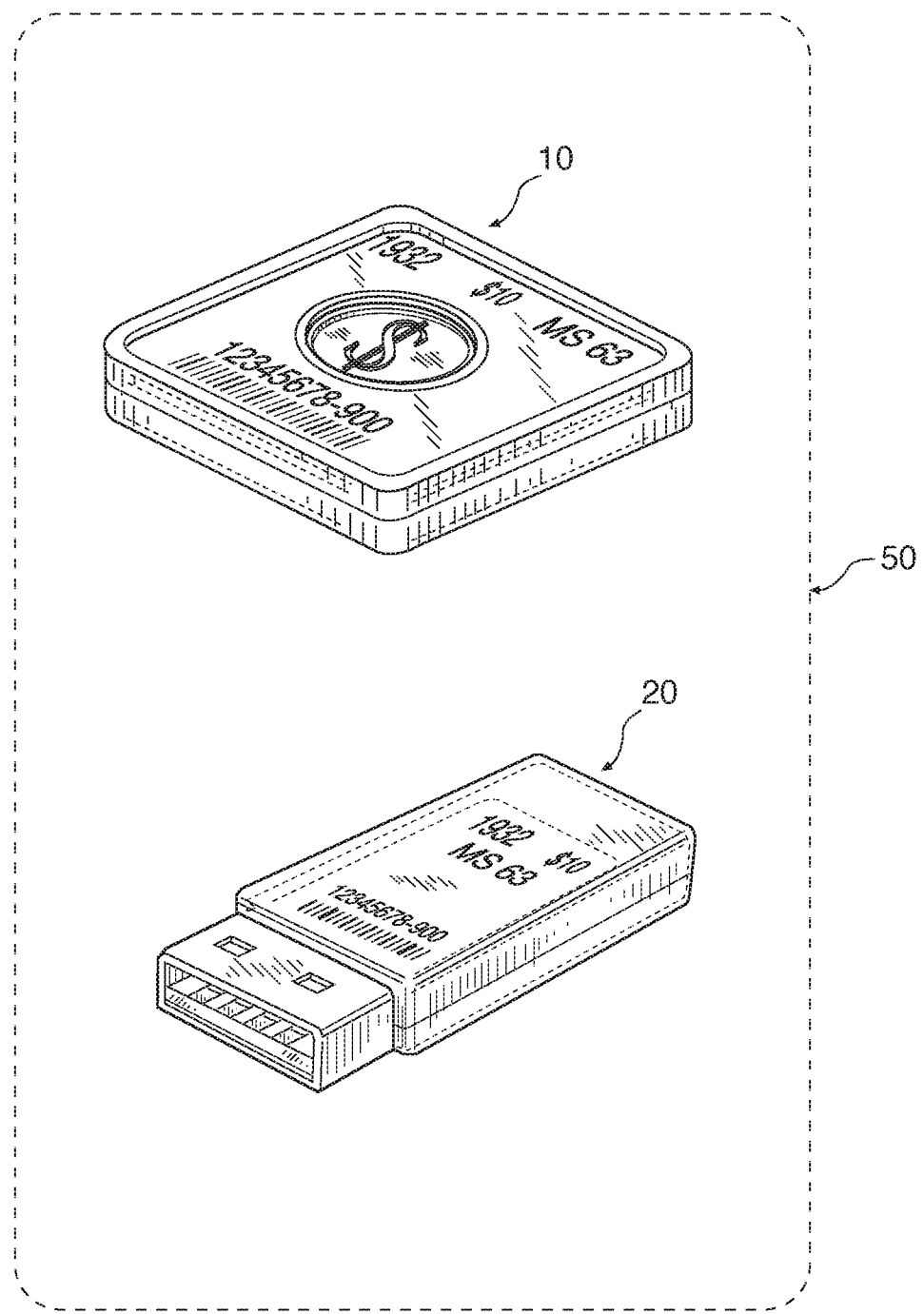
FIG. 10 shows a right front perspective view of an embodiment a collectable object housed in a holder and a data storage device that is useful for understanding the present invention.

FIG. 10 shows a right front perspective view of an embodiment of the present invention including a collectable object having visual markings, housed in a holder having associative visual markings of the collectable object, and, a data storage device having associative visual markings of the holder that houses the collectable object. FIG. 10 shows an embodiment of the present invention 50 for an "associative data storage device for authentication of collectable objects," and includes a non-volatile electronic data storage device (shown in assembled holder 20) for use in combination with at least one collectable object (shown in assembled holder 10). The non-volatile electronic data storage device is detached from the collectable object and electronically configured to store at least one immutable digital image of at least one unique appearance characteristic of a collectable object, such as a coin (shown in assembled holder 10). The data storage device is provided with tamper resistant visual markings (shown assembled with holder 20) that are associative with visual markings of the collectable object (shown assembled with holder 10), so as to provide association of data storage device with the collectable object. In FIG. 10, a collectable object (shown assembled with holder 10) is shown having a visual marking "$" that is associative with the visual markings seen on holder 10, such as inscription "$10," and also on non-volatile electronic data storage device (shown assembled with holder 20).

The non-volatile electronic data storage device (shown assembled with holder 20) is compatible with a standard computer system for viewing at least one digital image of at least one unique appearance characteristic of a collectable, such as the collectable coin (shown assembled with holder 10).

Figure 11:
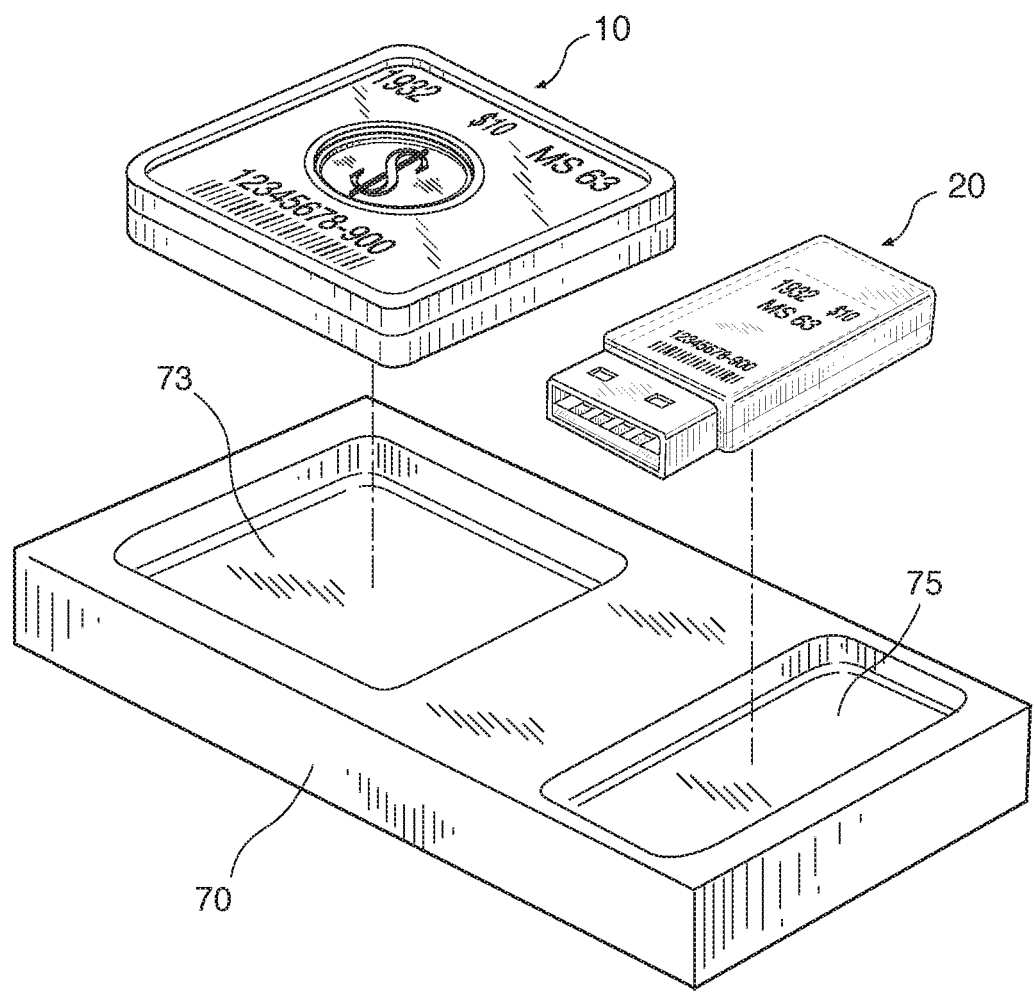
FIG. 11 shows a right front perspective view of a data storage device used in combination with a collectable object housed in a holder, detachably stored in a container having cavity openings fitted for storing the data storage device and the collectable object, that is useful for understanding the present invention.

FIG. 11 shows a right front perspective view of a present invention including a data storage device for use in combination with a collectable object (housed in a holder), detachably stored in a container having cavity openings fitted for storing the data storage device and the collectable object (shown in a holder), as used in the present invention. FIG. 11 shows a right front perspective view of a present invention including a non-volatile electronic data storage device (shown assembled with holder 20) for use in combination with a collectable object, such as a coin (shown assembled with holder 10), being detachably stored in container 70. Container 70 has a formed cavity 75 fitted for storing the data storage device (shown assembled with holder 20) and a formed cavity 73 fitted for storing the collectable object (shown assembled with holder 10). The data storage device is compatible with a standard computer system for viewing at least one digital image of at least one unique appearance characteristic of a collectable object, such as a coin (shown assembled with holder 10).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A collectable object authentication system comprising:
a hi-resolution digital camera in communication with
a nonvolatile data storage device having a data partition capable of being made immutable, and operational in a detached condition from a collectable object, the nonvolatile data storage device compatible with a computerized device;
the hi-resolution digital camera operated to record at least one hi-resolution digital image of at least one unique appearance characteristic of a collectable object at an image resolution of at least 300 pixel dots per inch at 1:1 image scale and storing said at least one hi-resolution digital image in the data partition of the nonvolatile data storage device, together with additional image data;
a tamper-resistant marking associated with the collectable object placed on the nonvolatile data storage device; and,
the data partition of the nonvolatile data storage device being rendered immutable.

2. The collectable object authentication system according to claim 1, further comprising:
a computer system comprising data storage configured to operate a database, the computer system in operative communication with the hi-resolution camera, the database storing said at least one hi-resolution digital image and the additional image data.

3. The collectable object authentication system according to claim 2, wherein the additional image data comprises a secure electronic hyperlink that provides access to the database.

4. A collectable object authentication system comprising:
a nonvolatile data storage device having an immutable data partition compatible with a computerized device, the nonvolatile storage device being preconfigured with at least one hi-resolution digital image of at least one unique appearance characteristic of a collectable object at an image resolution of at least 300 pixel dots per inch at 1:1 image scale together with additional image data; and, comparing the at least one hi-resolution image on the non-volatile storage device with a collectable object, if the at least one hi-resolution image and the object match, then determining that the object is authentic; if the at least one hi-resolution image and the object do not match, then determining that the object is not authentic.

5. The collectable object authentication system according to claim 4, further comprising a hi-resolution digital camera in operative communication with the computerized device, the hi-resolution digital camera operated to record at least one hi-resolution current image of the collectable object;
the comparing performed by comparing the at least one hi-resolution image from the nonvolatile data storage device with the at least one hi-resolution current image of the collectable object.

6. The collectable object authentication system according to claim 5, wherein the comparing is performed automatically by the computerized device, the computerized device preconfigured to perform the comparison.

7. The collectable object authentication system according to claim 5, further comprising the computerized device in communication with a database, the database preconfigured with the at least one hi-resolution digital image and additional image data, the additional data on the nonvolatile data storage device including an access key to allow access to the database at least one digital image, the comparing performed by comparing the at least one hi-resolution image from the database with the at least one hi-resolution current image of the collectable object.

8. The collectable object authentication system according to claim 1, wherein said non-volatile data storage is a solid-state flash memory data storage device.

9. The collectable object authentication system according to claim 1, wherein the unique appearance characteristic is an identification marking associated with the collectable object.

10. The collectable object authentication system according to claim 9, wherein the identification marking is on a holder for the collectable object.

11. A method of collectable object authentication comprising:
recording at least one hi-resolution digital image of at least one unique appearance characteristic of a collectable object at an image resolution of at least 300 pixel dots per inch at 1:1 image scale using a hi-resolution digital camera in communication;
placing a tamper-resistant marking associated with the collectable object on nonvolatile data storage device operational in a detached condition from the collectable object; and,
storing the at least one hi-resolution digital image together with additional image data in an immutable data partition of a nonvolatile data storage device, the nonvolatile data storage device compatible with a computerized device.

12. The method of collectable object authentication according to claim 11, further comprising:
    storing the at least one hi-resolution digital image and the additional image data on a computer system comprising data storage configured to operate a database, the computer system in operative communication with the hi-resolution camera.

13. The method of collectable object authentication according to claim 12, wherein the additional image data comprises a secure electronic hyperlink that provides access to the database.

14. The method of collectable object authentication according to claim 11, further comprising:
    comparing the at least one hi-resolution image on the non-volatile storage device with a collectable object;
    if the at least one hi-resolution image and the collectable object match, then determining that the object is authentic;
    if the at least one hi-resolution image and the collectable object do not match, then determining that the object is not authentic.

15. The method of collectable object authentication according to claim 11, further comprising:
    obtaining at least one hi-resolution current image of the collectable object using a hi-resolution digital camera in operative communication with the computerized device; and,
    the comparing performed by comparing the at least one hi-resolution image from the nonvolatile data storage device with the at least one hi-resolution current image of the collectable object.

16. The method of collectable object authentication according to claim 15, wherein the comparing is performed automatically by the computerized device, the computerized device preconfigured to perform the comparison.

17. The method of collectable object authentication according to claim 15, further comprising the computerized device in communication with a database, the database preconfigured with the at least one hi-resolution digital image and additional image data, the additional data on the nonvolatile data storage device including an access key to allow access to the database at least one digital image, the comparing performed by comparing the at least one hi-resolution image from the database with the at least one hi-resolution current image of the collectable object.

18. The method of collectable object authentication according to claim 11, wherein said non-volatile data storage is a solid-state flash memory data storage device.

19. The method of collectable object authentication according to claim 11, wherein the unique appearance characteristic is an identification marking associated with the collectable object.

20. The method of collectable object authentication according to claim 19, wherein the identification marking is on a holder for the collectable object.

\* \* \* \* \*